(12) United States Patent
Chow et al.

(10) Patent No.: US 9,942,172 B2
(45) Date of Patent: Apr. 10, 2018

(54) AUTO-NEGOTIATE EXTENSION FOR NETWORK CONNECTIONS

(71) Applicant: DELL PRODUCTS L.P., Round Rock, TX (US)

(72) Inventors: Ming Chung Chow, Pleasanton, CA (US); Kenneth Wayne Brock, San Jose, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 112 days.

(21) Appl. No.: 15/047,484

(22) Filed: Feb. 18, 2016

(65) Prior Publication Data

US 2017/0245226 A1    Aug. 24, 2017

(51) Int. Cl.
*H04L 12/28* (2006.01)
*H04L 12/931* (2013.01)
*H04W 52/50* (2009.01)

(52) U.S. Cl.
CPC ........... *H04L 49/351* (2013.01); *H04W 52/50* (2013.01)

(58) Field of Classification Search
None
See application file for complete search history.

(56) References Cited

U.S. PATENT DOCUMENTS

| | | | | |
|---|---|---|---|---|
| 5,884,041 | A * | 3/1999 | Hurwitz | H04L 29/06 370/231 |
| 6,026,494 | A * | 2/2000 | Foster | G06F 1/3209 713/300 |
| 6,457,055 | B1 * | 9/2002 | Hwong | H04L 12/40136 370/242 |
| 7,577,857 | B1 * | 8/2009 | Henderson | G06F 1/3203 713/320 |
| 2002/0157030 | A1 * | 10/2002 | Barker | H04L 12/12 713/320 |
| 2003/0033098 | A1 * | 2/2003 | Rakshani | G06F 1/266 702/60 |
| 2003/0221026 | A1 * | 11/2003 | Newman | H04L 29/06 710/8 |
| 2005/0165959 | A1 * | 7/2005 | Huff | H04L 49/351 709/238 |
| 2008/0219289 | A1 * | 9/2008 | Harrison | H04L 12/66 370/465 |
| 2012/0063295 | A1 * | 3/2012 | Bliss | H04L 1/0001 370/216 |
| 2013/0244585 | A1 * | 9/2013 | Chen | H04W 52/08 455/69 |

(Continued)

*Primary Examiner* — Anh-Vu Ly
(74) *Attorney, Agent, or Firm* — North Weber & Baugh LLP

(57) ABSTRACT

Aspects of the current patent document include systems and methods to improve configuration of network communication links between devices. In embodiments, a device may attempt auto-negotiation with another device in which transmit power levels are increased in an attempted to establish the link. In embodiments, an approach to establishing a link comprises setting the device in static mode but enabling link training. In yet another embodiment, a hybrid approach to interfaces link up may comprise having auto-negotiation with increasing transmit power attempts enabled by default, followed by static mode link up with link training enabled, in the case the auto-negotiation fails.

20 Claims, 4 Drawing Sheets

(56) References Cited

U.S. PATENT DOCUMENTS

| | | | | |
|---|---|---|---|---|
| 2014/0129854 A1* | 5/2014 | Diab | ................. | H04L 12/40045 |
| | | | | 713/310 |
| 2015/0229588 A1* | 8/2015 | Pillai | .................. | H04L 49/3054 |
| | | | | 370/437 |
| 2016/0308742 A1* | 10/2016 | Bains | ..................... | H04B 3/487 |
| | | | | 370/252 |
| 2017/0205867 A1* | 7/2017 | Hasui | .................... | G06F 1/3203 |
| | | | | 370/252 |

* cited by examiner

US 9,942,172 B2

AUTO-NEGOTIATE EXTENSION FOR NETWORK CONNECTIONS

TECHNICAL FIELD

The present invention relates generally to data communication networks and devices, and relates more particularly to negotiating connections between information handling devices.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Ever increasing demands for data and communications have resulted in vast arrays of ever expanding networks that comprise information handling systems. Configuring connections between network information handling systems can be time consuming and is important for optimal, or even passable, performance. Automating part of the process helps expedite the process. Often, such automated processes also help set values for the communication link. Thus, it is important for connections to be configured automatically and properly.

One such method is auto-negotiation. Auto-negotiation allows two information handling systems connected via an Ethernet link to advertise and negotiate the link operational mode—such as the speed of the link and the duplex configuration of half or full duplex. However, as network speeds and distances increase, sometimes the auto-negotiation fails.

Accordingly, what is needed our systems and methods that help improve the negotiation process for link configuration.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
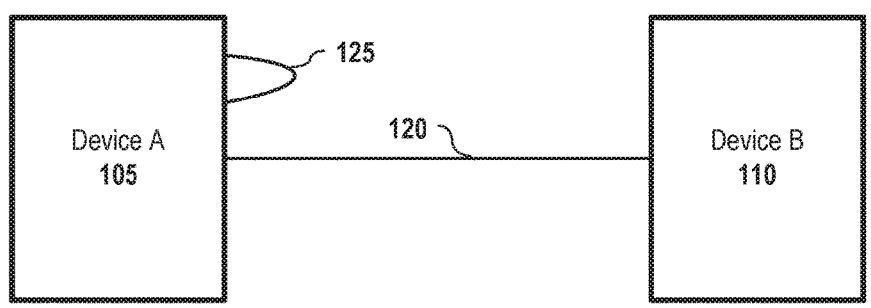
FIG. 1 ("FIG. 1") graphically depicts connection configurations according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system/device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "link," "linked," "coupled," "connected," "communicatively coupled," or their variants shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

The terms "packet," "datagram," "segment," or "frame" shall be understood to mean a group of bits that can be transported across a network. These terms shall not be interpreted as limiting embodiments of the present invention to particular layers (e.g., Layer 2 networks, Layer 3 networks, etc.); and, these terms along with similar terms such as "data," "data traffic," "information," "cell," etc. may be replaced by other terminologies referring to a group of bits, and may be used interchangeably. The terms "include," "including," "comprise," and "comprising" shall be understood to be open terms and any lists the follow are examples and not meant to be limited to the listed items. Any headings used herein are for organizational purposes only and shall not be used to limit the scope of the description or the claims.

Furthermore, it shall be noted that: (1) certain steps may optionally be performed; (2) steps may not be limited to the specific order set forth herein; (3) certain steps may be performed in different orders; and (4) certain steps may be done concurrently.

The current implementation of the Institute of Electrical and Electronics Engineers (IEEE) 802.3, Clause 73 auto-negotiation, CL73 for copper interfaces has limitations on what can be done with Clause 72 (CL72 for 40 G) or Clause 93 (CL93 for 100 G) link training and setting transmit amplitude (that is, transmit power) levels to the optimum values. Specifically, if a remote device has too weak a receiver, then the link may fail to establish even with auto-negotiate and link training enabled. IEEE standard 802.3ba for 40 G-CR4 or 802.3bj for 100 G-CR4, as well as the 25 G and 50 G Ethernet Consortium, do not mandate any change in the transmit level of power in the auto-negotiate/link training process. Similarly, the current implementation of link training when the auto-negotiation is not enabled (i.e., turned OFF) is not well defined in the IEEE standards. Furthermore, it should be noted that when auto-negotiation is off, link training is disabled by default. Thus, when auto-negotiation is not enabled, neither is link training.

FIG. 1 graphically depicts connection configurations according to embodiments of the present disclosure. In embodiments, a connection between two ports may be established. As shown in FIG. 1, a link between ports may be between: (1) two different devices, such as the link 120 between Device A 105 and Device B 110, or (2) two ports in the same device or system, such as link 125. As noted above, it is preferable that the link establish itself automatically, efficiently, and at the best possible setting. Accordingly, presented herein are approaches to the assist where other approaches have failed.

Figure 2:
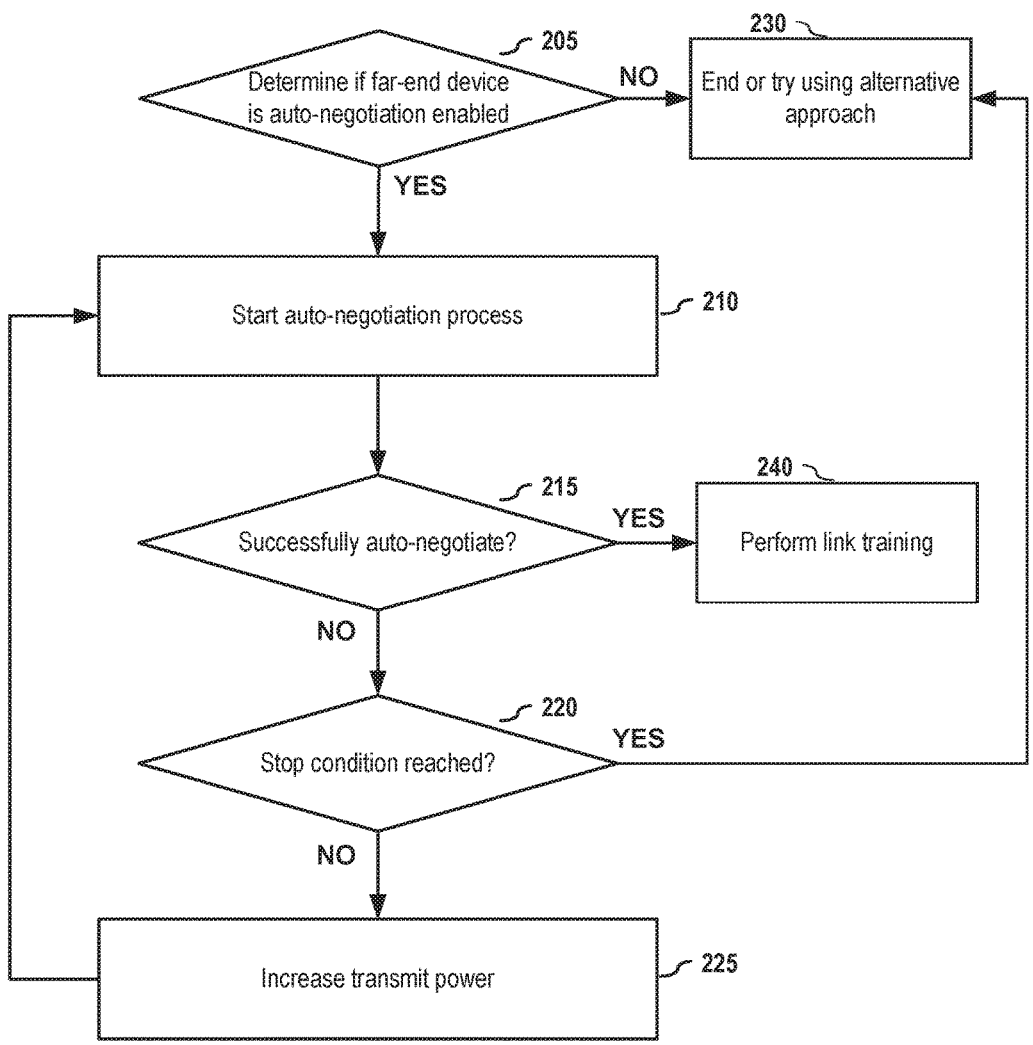
FIG. 2 depicts a methodology for facilitating the establishment of a connection according to embodiments of the present disclosure.

FIG. 2 depicts a methodology for facilitating the establishment of a connection according to embodiments of the present disclosure. In embodiments, the process commences by determining (205) whether the far-end device (or far-end port?) has auto-negotiation enabled. In embodiments, if the far-end device does not have auto-negotiation enabled, the near-end, or local, information handling system (or "device" in short) may end, alert an administrator, or try (230) one or more alternative approaches, including those disclosed herein, below.

In embodiments, if the far-end device has auto-negotiation enabled, the local device starts (210) the auto-negotiation link establishment process. If the attempt to auto-negotiate is successful (215), the process may continue as normal, including, for example, performing (240) link training.

However, if the attempt to auto-negotiate is unsuccessful (215), the process may involve increasing the transmission power and re-trying the auto-negotiation process. As shown in the embodiment depicted in FIG. 2, the local device may check (220) if a stop condition has been reached. A stop condition may include one or more of the following checks, which are provided by way of illustration only: determining whether a certain error or alert has been noted that would make proceeding unnecessary, whether a certain number of iterations have occurred, whether the transmission power is at its maximum, or other factors. It shall be noted that, in embodiments, this check may not be performed the first time through this iterative process. One skilled in the art shall recognize that the approach of FIG. 2 may be differently arranged to achieve the same results, but that such configuration are within the scope of the current disclosure. For example, in embodiments, steps 215 and 220 may be combined together in which one of the stop conditions is if the link was successfully established.

In embodiments, if the stop condition has not been reached (220), the local device may increase the transmission (Tx) power. In embodiments, the increases may be pre-set. For example, in embodiment, the local device may increase the local transmission amplitude value step-wise according to a table in cases where a link fails to establish. Table A, listed below, provides example values that may be employed.

TABLE A

| Passive copper cable length | Tx Power (driver current, Tx Amplitude) | For example |
|---|---|---|
| >5 m | Max setting | 0xf (15) |
| 5 m | Max setting | 0xf (15) |
| 4 m | Max setting - 1 level or tap | 0xe (14) |
| 3 m | Max setting - 2 levels or taps | 0xd (13) |
| 2 m | Max setting - 3 levels or taps | 0xc (12) |
| 1 m | Max setting - 4 levels or taps | 0xb (11) |

Table A provides an example base setting based upon cable type/length, and this may be used as the starting value for the auto-negotiation process. For example, if the link is not established within a predetermined timeout interval, in embodiments, the local transmit power value may be increased and the auto-negotiation process restarted by returning to step 210.

In embodiments, if the stop condition has been reached (220), the local device may end, alert an administrator, or try (230) one or more alternative approaches, including those disclosed herein, below.

Figure 3:
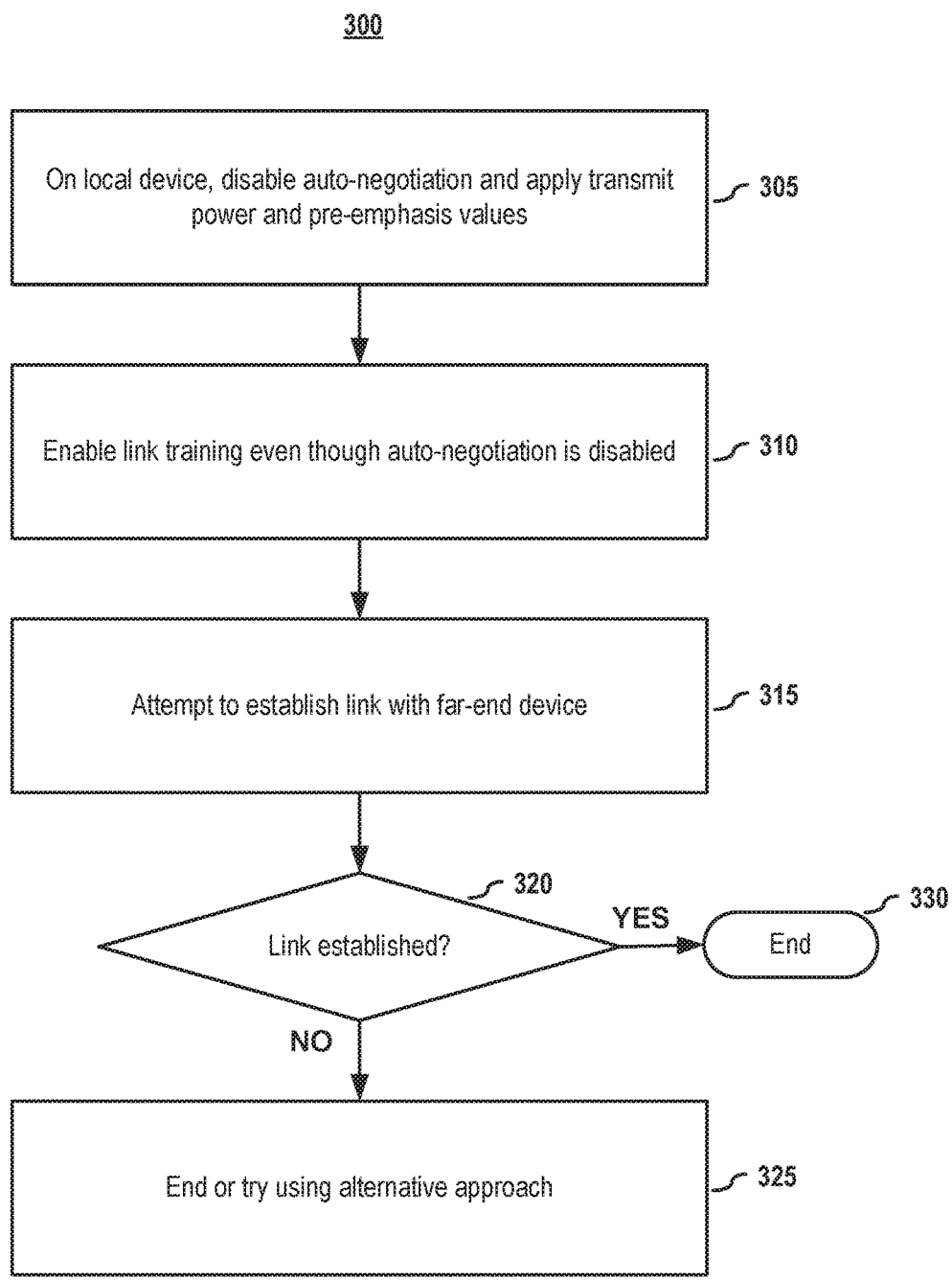
FIG. 3 depicts another methodology for facilitating the establishment of a connection according to embodiments of the present disclosure.

FIG. 3 depicts a methodology for facilitating the establishment of a connection according to embodiments of the present disclosure. It shall be noted that the method depicted in FIG. 3 may be used in conjunction with the method of FIG. 2 or independently of it. For example, during the auto-negotiation process, the local device may check the far-end device for auto-negotiation capability. If the far-end device is not auto-negotiation capable (e.g., if such capability is disabled, not advertised, or unknown), the local device may switch to using the static transmission settings with link training enabled as follows.

In embodiments, in the auto-negotiation mode, if the link does not establish (for example, after the upper bound for the transmit power value has been reached or after typical auto-negotiation failure), then a link failure would be declared. In embodiments, the local device may set (305) the transmit power level and pre-emphasis values (such as being set to base values or values obtained from prior attempts) and turn off auto-negotiation.

Turning off auto-negotiation comprises the link up process using the static settings mode. However, as noted previously, when auto-negotiation is turned off, link training is also disabled. Accordingly, in embodiments, the local device enables (310) link training even though auto-negotiation is disabled. Using static settings and link training enabled, the local-end device attempts to establish (315) a link with the far-end device.

In embodiments, if the link is established, link training may be performed and the process successfully concludes.

In embodiments, if the link was not established, the local device may end, alert an administrator, or try (230) one or more alternative approaches. In embodiments, an alternative approach may be attempting to establish the link using normal static settings with link training disabled.

As noted above, the methods of FIGS. 2 and 3 may be combined into a single hybrid approach to copper interfaces linking, such as having auto-negotiation with increasing transmit power attempts enabled by default followed by static mode link up with link training enabled, in the case the auto-negotiation fails.

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 4:
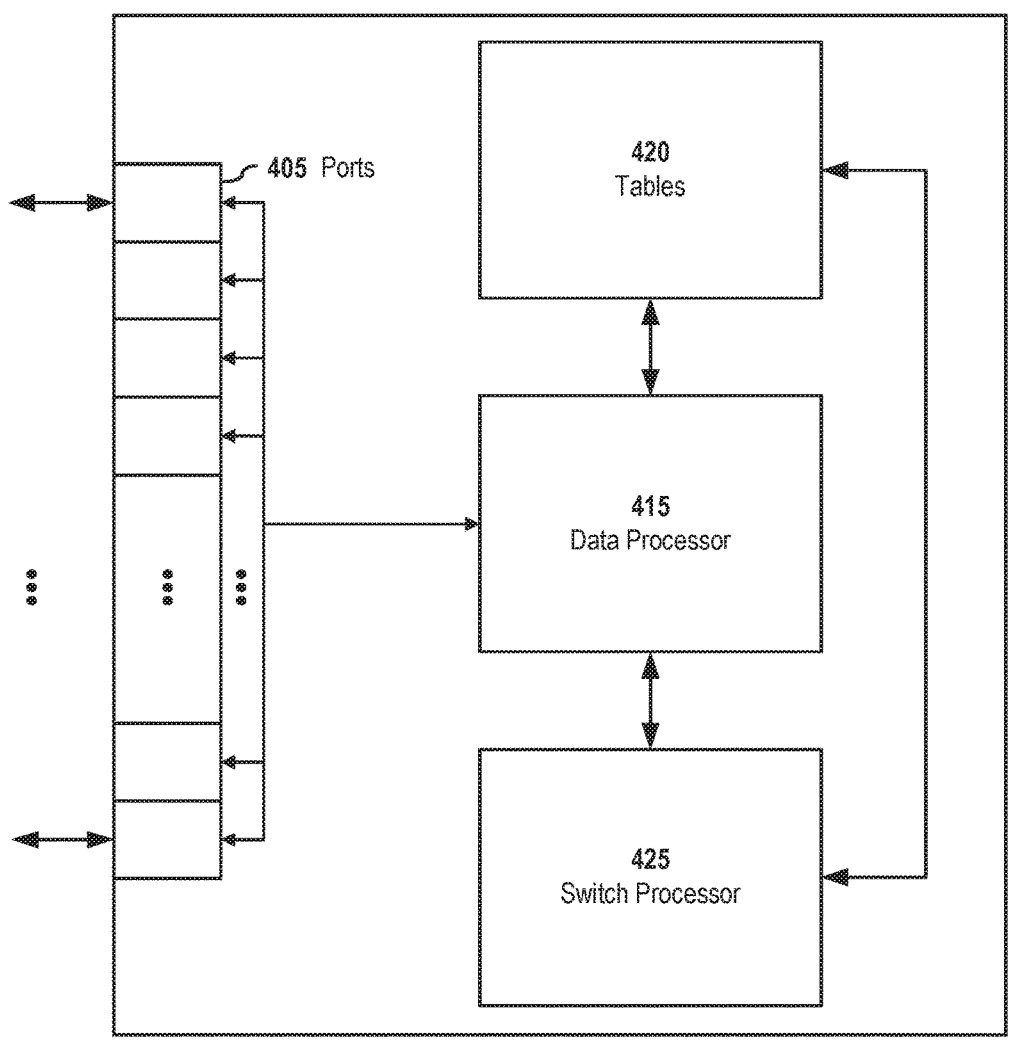
FIG. 4 graphically depicts a simplified block diagram of an information handling system according to embodiments of the present invention.

FIG. 4 depicts a block diagram of an information handling system 400 according to embodiments of the present disclosure. It will be understood that the functionalities shown for system 400 may operate to support various embodiments of an information handling system—although it shall be understood that an information handling system may be differently configured and include different components. As illustrated in FIG. 4, system 400 may comprise a plurality of I/O ports 405, a data processing and fabric component or processor 415, tables 420, and a switch control functionality processor 425. In embodiments, the I/O ports 405 are connected to one or more nodes. The data processing functionality 415 may use information included in the network data received at the device 400, as well as information stored in the tables 420, to identify a next hop for the network data, among other possible activities. In embodiments, the switching fabric then schedules the network data for propagation through the device to an egress port for transmission to the next hop.

In the illustrated system, all major system components may connect by one or more bus, back planes, or other connections, which may represent more than one physical connection. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A computer-implemented method for facilitating link establishment between a first device and a second device, the method comprising:
   [a] commencing an auto-negotiation link establishment process with the second device;
   [b] determining whether the auto-negotiation link establishment process failed to establish the link; and
   [c] responsive to the auto-negotiation link establishment process having failed to establish the link:
      [d] increasing transmission power for the auto-negotiation link establishment process; and
      [e] repeating the auto-negotiation link establishment process using the increased transmission power.

2. The computer-implemented method of claim 1 further comprising:
   [b2] determining whether a stop condition has been reached before proceeding.

3. The computer-implemented method of claim 2 further comprising:
   responsive to a stop condition having not been reached, proceeding to steps [c]-[e].

4. The computer-implemented method of claim 2 further comprising:
   responsive to a stop condition having been reached:
      not performing steps [c]-[e]; and
      using an alternative approach to establish the link.

5. The computer-implemented method of claim 4 wherein an alternative approach comprising:
   disabling auto-negotiation;
   apply transmit power and pre-emphasis values for a static settings mode link establishment;
   enabling link training even though auto-negotiation is disabled; and
   attempting to establish the link.

6. The computer-implemented method of claim 5 further comprising:
   responsive to the link not being established, ending or using a static settings link establishment mode without link training to attempt to establish the link.

7. The computer-implemented method of claim 1 further comprising:
   as a preliminary step, attempting to determine whether the second device supports the auto-negotiation link establishment process; and
   responsive to the second device not supporting the auto-negotiation link establishment process:
      apply transmit power and pre-emphasis values for a static settings link establishment mode;
      enabling link training even though auto-negotiation is disabled; and
      attempting to establish the link.

8. The computer-implemented method of claim 7 further comprising:
   responsive to the link not being established, ending or using a static setting mode without link training being enabled to attempt to establish the link.

9. A non-transitory computer-readable medium or media comprising one or more sequences of instructions which, when executed by at least one processor, causes steps to be performed comprising:
   [a] commencing an auto-negotiation link establishment process with a far-end device;
   [b] determining whether the auto-negotiation link establishment process failed to establish the link; and
   [c] responsive to the auto-negotiation link establishment process having failed to establish the link:
      [d] increasing transmission power for the auto-negotiation link establishment process; and
      [e] repeating the auto-negotiation link establishment process using the increased transmission power.

10. The non-transitory computer-readable medium or media of claim 9 further comprising one or more sequences of instructions which, when executed by at least one processor, causes steps to be performed comprising:
   [b2] determining whether a stop condition has been reached before proceeding.

11. The non-transitory computer-readable medium or media of claim 10 further comprising one or more sequences of instructions which, when executed by at least one processor, causes steps to be performed comprising:
   responsive to a stop condition having not been reached, proceeding to steps [c]-[e].

12. The non-transitory computer-readable medium or media of claim 10 further comprising one or more sequences of instructions which, when executed by at least one processor, causes steps to be performed comprising:
   responsive to a stop condition having been reached:
      not performing steps [c]-[e]; and
      using an alternative approach to establish the link.

13. The non-transitory computer-readable medium or media of claim 10 wherein the alternative approach to establishing the link comprises:
   disabling auto-negotiation;
   apply transmit power and pre-emphasis values for a static settings mode link establishment;
   enabling link training even though auto-negotiation is disabled; and
   attempting to establish the link.

14. The non-transitory computer-readable medium or media of claim 13 further comprising one or more sequences of instructions which, when executed by at least one processor, causes steps to be performed comprising:
   responsive to the link not being established, ending or using a static settings link establishment mode without link training to attempt to establish the link.

15. The non-transitory computer-readable medium or media of claim 9 further comprising one or more sequences of instructions which, when executed by at least one processor, causes steps to be performed comprising:
   as a preliminary step, attempting to determine whether the far-end device supports the auto-negotiation link establishment process; and
   responsive to the far-end device not supporting the auto-negotiation link establishment process:
      apply transmit power and pre-emphasis values for a static settings link establishment mode;
      enabling link training even though auto-negotiation is disabled; and
      attempting to establish the link.

16. The non-transitory computer-readable medium or media of claim 15 further comprising one or more sequences of instructions which, when executed by at least one processor, causes steps to be performed comprising:

responsive to the link not being established, ending or using a static setting mode without link training to attempt to establish the link.

17. An information handling system comprising:

at least one communication port for establishing a link with a second information handling system;

one or more processors; and a non-transitory computer-readable medium or media comprising one or more sequences of instructions which, when executed by the one or more processors, causes steps to be performed comprising:

[a] commencing an auto-negotiation link establishment process with the second information handling system;

[b] determining whether the auto-negotiation link establishment process failed to establish the link; and

[c] responsive to the auto-negotiation link establishment process having failed to establish the link:

[d] increasing transmission power for the auto-negotiation link establishment process; and

[e] repeating the auto-negotiation link establishment process using the increased transmission power.

18. The system of claim 17 wherein the non-transitory computer-readable medium or media further comprises one or more sequences of instructions which, when executed by at least one processor, causes steps to be performed comprising:

[b2] determining whether a stop condition has been reached before proceeding;

responsive to a stop condition having not been reached, proceeding to steps [c]-[e]; and responsive to a stop condition having been reached:
    not performing steps [c]-[e]; and
    using an alternative approach to establish the link.

19. The system of claim 17 wherein the non-transitory computer-readable medium or media further comprises one or more sequences of instructions which, when executed by at least one processor, causes steps to be performed comprising:

disabling auto-negotiation;

apply transmit power and pre-emphasis values for a static settings mode link establishment;

enabling link training even though auto-negotiation is disabled; and attempting to establish the link.

20. The system of claim 19 wherein the non-transitory computer-readable medium or media further comprises one or more sequences of instructions which, when executed by at least one processor, causes steps to be performed comprising:

responsive to the link not being established, ending or using a static settings link establishment mode without link training to attempt to establish the link.

* * * * *